United States Patent Office 2,939,798
Patented June 7, 1960

2,939,798

CEMENTING COMPOSITION

Alexander S. Curlet, Pointe-a-Pierre, Trinidad, British West Indies, assignor to Texaco Trinidad Inc., Pointe-a-Pierre, Trinidad, British West Indies No Drawing. Filed Aug. 28, 1958, Ser. No. 757,677

5 Claims. (Cl. 106—99)

This invention relates to cementing compositions and to a cementing method employing the same. More particularly, this invention relates to the cementing of oil, gas and water wells. Still more particularly, this invention is directed to an improved cementing composition.

In completing wells for production, casing is usually inserted into the well bore and fixed in place by placing cement in the annular space between the casing and the well bore. Cements or cementing compositions generally used employ hydraulic cements such as Portland cement or modified Portland cements. Normally fluid cementing compositions usually weigh over 100 lbs. per cu. ft., such as a weight in the range 110–120 lbs. per cu. ft. Often, however, in a well being cemented the characteristics of the subsurface formations penetrated by the well bore are such that there is a limiting pressure gradient in the well bore which, if exceeded, will cause the cement to be lost within the formation without completely filling the annular space between the well bore and the casing. When such formation conditions exist light weight cement slurries are usually employed. For example, it is well known to employ light weight fluid cement slurries weighing as little as 90 lbs. per cu. ft. by incorporating in the cement slurry (mixture of cement and water) a finely ground hydratable clayey material such as bentonite. However, there exist many formations where even cement slurries weighing as little as 90 lbs. per cu. ft. create a hydrostatic head sufficient to break down the formation with the result that the cement is lost into the formation. Additionally it sometimes happens because of the relatively high yield value of the hydratable clay incorporated in the cement slurry, formation breakdown is encountered due to the high pressure required to break or start circulation of the thus-prepared cement slurry into the annular space between the well bore and casing. This situation usually arises when for some reason it is required to discontinue pumping during the cementing operation.

It is an object of this invention to provide an improved cementing composition and additive admixture for preparing the same.

It is another object of this invention to provide an improved method of well cementing.

Still another object of this invention is to provide an improved light weight cementing composition and additive admixture for preparing the same.

Yet another object of this invention is to provide a cementing composition which yields a better bond between the formation or well bore and the casing or object being cemented within a well bore.

Still another object of this invention is to provide a cementing composition which upon setting possesses better perforating characteristics.

How these and other objects of this invention are accomplished will become apparent with reference to the accompanying disclosure. In at least one embodiment of the practice of this invention at least one of the foregoing objects will be achieved.

In accordance with this invention it has now been discovered that an improved cementing composition is provided wherein the cementing composition contains incorporated or admixed therein ground coconut shell. Ground coconut shell in a cementing composition in accordance with this invention has been found to be very desirable since it not only yields a relatively light weight cementing composition but also yields a cement which, after setting, possesses superior perforating characteristics. Further, it has also been observed that the ground coconut in the cementing composition, upon introduction of the cementing composition into the well bore in order to cement a casing therein, effects a better bonding between the well bore or formation and the casing due to the scouring action exerted by the ground coconut particles upon the face of the well bore, tending to abrade the same and to wear away the mud sheath therefrom. Further, it has also been observed that a cementing composition containing ground coconut shell therein exhibits high pumpability or is rather readily pumpable under conditions of relatively high temperature and pressure.

In accordance with one embodiment of the practice of this invention there is provided a solids additive admixture containing cement and ground coconut shell admixed therewith. If desired, there may be incorporated in this dry, solids additive admixture a suitable amount of a hydratable clayey material, such as bentonite, so as to avoid solids settling and to provide a more readily pumpable cementing composition when the dry additive admixture is added to water.

In an additive admixture containing cement and ground coconut shell in accordance with this invention the ground coconut shell may comprise a major or minor amount of the additive admixture. Usually the ground coconut shell comprises a minor amount, such as an amount in the range 5–40%, of the resulting admixture, the remainder being cement. Also, when a hydratable clayey material such as bentonite is incorporated in the dry additive admixture prepared in accordance with this invention the hydratable clayey material generally comprises only a minor amount, such as an amount in the range 5–40%, of the resulting admixture, the remainder being cement and ground coconut shell.

A cementing composition is prepared in accordance with the practice of this invention by incorporating, either separately or in the form of an additive admixture, cement and ground coconut shell in water. If desired, a suitable amount of a hydratatable clayey material, such as bentonite, may also be incorporated to improve the viscosity and pumping characteristics of the resulting cementing composition and to obviate solids settling.

In a fluid or slurry-type cementing composition prepared in accordance with the practice of this invention the ground coconut shell would comprise a minor amount thereof, such as an amount in the range 5–30% by weight. Similarly, hydratable clayey material when incorporated therein will comprise only a minor amount of the fluid cementing composition, such as an amount in the range 1–20% by weight. Any suitable amount of cement is incorporated in the fluid cementing composition depending upon the setting characteristics desired and the type of cement employed. Generally, a hydraulic cement such as Portland cement is employed in well cementing compositions. Other suitable cements may be employed in the preparation of cementing compositions and solids additive admixture of the type disclosed herein.

Fluid cementing compositions embodying the practice of this invention are characterized by a relatively light weight, such as a weight in the range 70–90 lbs. per cu. ft., more or less, usually a weight in the range 78–86 lbs.

per cu. ft. depending upon the cement and/or coconut shell content. Satisfactory cementing compositions containing ground coconut shell may be prepared having a specific gravity in the range 1.10–1.45 depending upon the amount of ground coconut shell incorporated in the cementing composition. The greater the amount of coconut shell incorporated therein, since ground coconut shell is a relatively low density material, the lighter the resulting cementing composition.

The following cementing composition, slurry density 86 lbs. per cu. ft., has been found to be particularly satisfactory as a well cementing composition:

| Ingredient | Parts by wt. | Percent by wt. | Percent by wt. based on solids |
|---|---|---|---|
| Portland cement | 100 | 31.3 | 62.5 |
| bentonite | 20 | 6.25 | 12.5 |
| coconut shell, −8 to +20 mesh | 10 | 3.13 | 6.25 |
| coconut shell, −20 to +100 mesh | 20 | 6.25 | 12.5 |
| coconut shell, −100 mesh | 10 | 3.13 | 6.25 |
| water | 160 | 50 | |

Shrinkage and crushing strength tests carried out on samples of cements having the above composition, wherein the samples were set at 100° F. and 1500 p.s.i.g. for varying periods of time, gave the following results:

| Setting Time (days) | Shrinkage (percent v./v.) | Crushing strength (p.s.i.) |
|---|---|---|
| 1 | 2 | 25 |
| 3 | 2 | 170 |
| 7 | 1 | 240 |

As indicated by the above data, the set strength of a cement prepared in accordance with the practice of this invention is low relative to conventional oil well cements. However, the ultimate strength of the cement is adequate for safe anchoring of the casing to the formation and permanent sealing of the annular space between the casing and the formation or well bore. Under some conditions the early strength may be considered too low to permit tools to work inside the casing while waiting on the development of adequate cement strength. In such cases, however, the strength of the early set cement may be improved by employing a high early strength cement and/or use of an accelerator such as calcium chloride together with the cement.

It has been observed in the many well cementing operations employing a cement prepared in accordance with this invention, that the cementing operations were readily carried out and no loss of circulation troubles were experienced. This is attributed to the fact that the resulting cementing composition is relatively light weight, thus the static head in cementing is reduced and also due to the fact that the dynamic head, due to pumping during the cementing operation, is minimized because the cementing composition is highly fluid and manifests no significant yield value during shut down. Also the coconut shell content of the cementing composition or slurry acts as a bridging agent to seal off weak zones encountered or induced in the formation penetrated by the well bore undergoing cementing.

Further, it is mentioned that the cement when set exhibits substantially improved perforating characteristics due to the low ultimate strength of the cement. This appears to be due to the fact that a cement prepared in accordance with the practice of this invention pulverizes rather than shatters on perforation and, accordingly, is less likely to cause plugging of the resulting perforations.

In preparing compositions, dry, solids additive admixture compositions and fluid or slurry-type cementing compositions, in accordance with the practice of this invention it is desirable that the ground coconut shell be graded. More particularly, in the practice of this invention it is desirable that the ground coconut shell have a particle size in the range such that substantially all of the ground coconut shell is smaller than 8 mesh. More particularly, it is preferred to employ ground coconut shell having a particle size in the range such that about 20–30% by weight is in the range less than 8 mesh to greater than 20 mesh, 40–60% by weight has a particle size in the range less than 20 mesh and greater than 100 mesh and 20–30% has a particle size smaller than 100 mesh. Particularly preferred in the practice of this invention is ground graded coconut shell having the particle size distribution about 25% by weight having a particle size in the range −8 to +20 mesh, about 50% by weight having a particle size in the range −20 to +100 mesh and 25% by weight having a particle size less than 100 mesh.

As will be apparent to those skilled in the art many modifications, changes and substitutions are possible in the practice of this invention without departing from the spirit or scope thereof.

I claim:

1. An additive admixture suitable for the preparation of a relatively light weight cementing composition consisting essentially of Portland cement and ground coconut shell, said coconut shell being present in said admixture in an amount in the range 5–40% by weight.

2. A composition in accordance with claim 1 wherein said ground coconut shell has a particle size in the range about 25% by weight −8 to +20 mesh, about 50% by weight −20 to +100 mesh and about 25% by weight less than 100 mesh.

3. A light weight cementing composition consisting essentially of about 50% by weight water, 31% by weight Portland cement, 6% by weight bentonite and about 13% by weight ground coconut shell, said ground coconut shell having a particle size in the range such that about 25% by weight has a particle size in the range −8 to +20 mesh, about 50% by weight has a particle size in the range −20 to +100 mesh and about 25% by weight has a particle size less than 100 mesh.

4. A method of cementing a casing within a well bore which comprises positioning in the annular space between said well bore and said casing a light weight cementing composition having a weight in the range 70–90 lbs. per cu. ft. and consisting essentially of water containing admixed therewith Portland cement, hydratable bentonitic clay in the range 1–20% by weight and ground coconut shell in the range 5–30% by weight.

5. A method of cementing a casing within a well bore which comprises introducing into the annular space between said well bore and said casing a relatively light weight cementing composition consisting essentially of about 50% by weight water, 31% by weight Portland cement, 6% by weight bentonite and 13% by weight ground coconut shell.

References Cited in the file of this patent

UNITED STATES PATENTS

| 780,603 | De Solla | Jan. 24, 1905 |
| 2,695,669 | Sidwell | Nov. 30, 1954 |
| 2,811,207 | Clark | Oct. 29, 1957 |

OTHER REFERENCES

J. K. Henderson et al., World Oil, pp. 271–276, April 1956.